United States Patent
Dermitzakis et al.

(10) Patent No.: US 10,184,455 B2
(45) Date of Patent: Jan. 22, 2019

(54) WIND TURBINE OF LOW WIND SPEEDS

(71) Applicants: Emmanuil Dermitzakis, Attikis (GR); Aristeidis Dermitzakis, Attikis (GR)

(72) Inventors: Emmanuil Dermitzakis, Attikis (GR); Aristeidis Dermitzakis, Attikis (GR)

( * ) Notice: Subject to any disclaimer, the term of this patent is extended or adjusted under 35 U.S.C. 154(b) by 311 days.

(21) Appl. No.: 14/913,147

(22) PCT Filed: Aug. 20, 2014

(86) PCT No.: PCT/GR2014/000047
§ 371 (c)(1),
(2) Date: Feb. 19, 2016

(87) PCT Pub. No.: WO2015/036806
PCT Pub. Date: Mar. 19, 2015

(65) Prior Publication Data
US 2016/0208772 A1    Jul. 21, 2016

(30) Foreign Application Priority Data

Aug. 20, 2013 (GR) .............................. 20130100479

(51) Int. Cl.
*F03D 15/20* (2016.01)
*F03D 13/10* (2016.01)
(Continued)

(52) U.S. Cl.
CPC .......... *F03D 15/20* (2016.05); *F03D 1/0625* (2013.01); *F03D 1/0666* (2013.01); *F03D 7/02* (2013.01);
(Continued)

(58) Field of Classification Search
CPC .......... F03D 1/025; F03D 1/02; F03D 1/0625; F03D 1/0666; F03D 7/0276; F03D 9/00
See application file for complete search history.

(56) References Cited

U.S. PATENT DOCUMENTS

| | | | | |
|---|---|---|---|---|
| 2,177,801 A | * | 10/1939 | Erren | H02K 16/005 290/55 |
| 5,533,865 A | * | 7/1996 | Dassen | F03D 1/0608 244/200 |
| 8,502,403 B2 | * | 8/2013 | Merswolke | F03D 9/25 290/44 |

FOREIGN PATENT DOCUMENTS

| | | | | |
|---|---|---|---|---|
| DE | 102009011603 A1 | * | 9/2010 | ........... F03D 1/0658 |
| FR | 627371 A | * | 10/1927 | ............. F03D 1/025 |

OTHER PUBLICATIONS

FR627371 Specification in English, Espacenet.*
DE10200901160 Specification in English, Espacenet.*

* cited by examiner

*Primary Examiner* — Logan M Kraft
*Assistant Examiner* — John S Hunter, Jr.
(74) *Attorney, Agent, or Firm* — Michael D. Eisenberg

(57) ABSTRACT

Horizontal axis W/T of low wind speeds of propeller type, bearing a main rotor of three blades (1), while in the space between two successive blades (1) and diametrically opposite to the third, an additional 4th blade (2) also of propeller type but of significantly longer length, is interposed. This additional blade (2) is not permanently coupled but selectively engaged in the system of the W/T at low wind speeds, contributing to the startup and enhancing the energy production. The blade (2) bears diametrically opposite a counterweight (15) to balance the forces developed, and rotates in a plane parallel to the main rotor. The coupling of the blade (2) is preferably made at the stand-by state or at low wind speed operation of the W/T, while the uncoupling will be performed during operating state and at the rated power. The blade (2) after uncoupling, gets in vertical position and remains immobilized attached to the tower.

9 Claims, 4 Drawing Sheets

(51) Int. Cl.
  *F03D 9/25* (2016.01)
  *F03D 7/02* (2006.01)
  *F03D 15/00* (2016.01)
  *F03D 1/06* (2006.01)

(52) U.S. Cl.
  CPC ......... *F03D 7/0224* (2013.01); *F03D 7/0244* (2013.01); *F03D 9/25* (2016.05); *F03D 13/10* (2016.05); *F03D 15/00* (2016.05); *F05B 2240/2021* (2013.01); *F05B 2260/403* (2013.01); *F05B 2260/404* (2013.01); *Y02E 10/721* (2013.01); *Y02E 10/723* (2013.01)

WIND TURBINE OF LOW WIND SPEEDS

The present invention relates to a horizontal axis wind turbine of propeller type capable of operating at low wind speeds and low wind potential regions, by selectively coupling and uncoupling of an additional fourth blade to the existing conventional main rotor.

THE STATE OF THE ART

Wind turbines along with the Photovoltaics are the most important technology of energy production from RES. It is a system of electromechanical energy conversion, where the turbine drives a generator. It is known that the power output from the wind turbine is, proportional to the third power of wind speed V on the surface area A of the rotor: $N=f(V^3*A)$ and as a consequence and proportional to the square of the rotor diameter D: $N=f(V^3*D^2)$, since $A=\pi D^2/4$.

The energy production and the startup and rotation, begins when the power output N of the wind turbine (W/T) overcomes the startup losses (friction on the shaft, in the gearbox, in the generator, etc.) and rises in a value $N_c$, which corresponds to the startup wind speed (cut-in speed) $V_c$, which is normally ≥3,5-4,5 m/sec.

Hence, for low wind speeds, $V \leq V_c$, the wind power remains unexploited, but immediately after that speed $(V \geq V_c)$ the power output increases exponentially relative to the wind speed until it reaches for the first time the rated power $N_o$. of the wind turbine (W/T), which corresponds to the rated output speed $V_R$ and to the maximum value of the power factor $C_p$.

From this value of wind speed $(V \geq V_R)$ onward, the power output of the W/T remains approximately constant, both for operational and for stability reasons, and the surplus of the wind energy potential remains unexploited until the wind speed exceeds the safety limit, the cut-out speed $V_F$ (20-30 m/sec), wherein the operation of the W/T for safety reasons is stopped completely. It is obvious that the main drawback of the state of the art W/Ts is that they do not operate (not rotating) at low wind speeds (≤3,5-4,5 m/sec) resulting in: a) installations at remote and inaccessible regions, but of high wind potential, away from the centers of energy consumption requiring extensive energy transportation network, b) lowland, low altitude regions or even entire country areas to be excluded due to their low wind potential where usually energy consumption is higher, c) fewer hours of operation throughout the year and thus lower efficiency, increasing the cost of produced energy, making most of the investments unprofitable.

To be noted that the low wind speeds (≤3,5-4,5 m/sec) show a statistically higher frequency in comparison to the higher speeds making the extension of energy production at low speeds one of the critical sectors and one of the more substantial challenges of the scientific research.

The energy production could be increased by subsequently increasing the diameter D of the rotor. This seemingly correct solution could improve the production if it only did not create other issues, such as the increase of the wind pressure onto the rotor (drag), which consequently requires significant reinforcing all of W/T's elements, such as the foundation, the base, the tower, the shaft, the gearbox, the generator and in general the entire support and the energy conversion system of the W/T, beside the increased cost of the larger rotor itself.

It is to be noted that the cost of the rotor: a) is the most significant cost parameter of the W/T system, b) the cost is increased exponentially with the increase of diameter D, and in addition affecting the total installation cost. Thus, a significant increase in the diameter D would significantly increase the total cost, without proportional benefit gains.

The increase only of the diameter D of the rotor will undoubtedly benefit the production only during the period of low wind speeds, where a conventionally dimensioned rotor and a conventionally dimensioned W/T in general, could not overcome the startup losses. On the contrary, in the period of high wind speeds, the increase of the diameter will not benefit the system by increasing the energy production, since the operation of the W/T at high speeds has anyway certain limits (by means of "active pitch control", or "passive stall control") and the surplus potential of the wind is lost.

An attempt to solve this issue and to increase the production at low wind speeds by increasing the rotor diameter D, is applied by the company Siemens, with an aeroelastic rotor, (aeroelastic effect) as well as by the US patent publication 2013/0189116. This type of rotor, which is slightly larger in diameter than a conventional dimensioned rotor for the same rated power, enables at high wind speeds an automatic twisting and bending of the blades by the action of the wind pressure (drag) itself.

Through the twisting of the blades by the wind an altering in the angle of attack is achieved (both angle setting and limitation of power output) while through the bending the swept area of the rotor is reduced, limiting the increase of the power output in the conventional levels, reducing the increase of pressure (drag) exerted, that would require augmented dimensioning of the entire W/T system.

The disadvantages of this method are that: a) the blades in order to be effective, should be manufactured and transported absolutely seamless without any intermediate connection joints which limits its use (requiring special vehicles, or ships for transportation) almost exclusively to off-shore installations, while in inaccessible regions, or on mountain peaks, the typical W/T's installation areas, their transportation is impossible, b) the range of the increased diameter, compared to the conventional ones, cannot exceed 7%-8%, with proportionally limited results in the increase of the power output, c) the sensitivity and durability of the blades depends on many and uncertain factors (combination of several types of materials, bonding in successive phases and layers under specific angles and thicknesses, all of which are highly likely to fail etc.) while the quality cannot be easily standardized, d) the exposure of the blade in continuous, dynamic, and simultaneous bending and twisting forces, raises complex issues of material fatigue in contrary to the relatively rigid blades of conventional W/Ts, and e) the operational behavior of the system is not by any means linear and the complex construction of the blade must be linked and seemingly follow the ever-changing flow field, requiring stern know-how and development of completely new and complex "tools".

Other technologies provide two or more generators, a much smaller and a little greater than the rated power of the W/T, which are successively connected to the system in order to minimize the startup losses at low wind speeds (smaller generator), and to achieve higher efficiency at high wind speeds at full load (greater generator).

BRIEF DESCRIPTION OF THE INVENTION

The main horizontal axis W/T of propeller type bearing: the typically three conventional blades, the rotor hub, the tower, the nacelle with the mechanisms, the shaft of rotation, the gearbox, the generator, the brake and safety systems, etc. At the space between two successive blades and diametrically opposite, aligned with the third blade, is interposed an additional fourth blade also of propeller type, but considerably longer.

This additional fourth blade also differs from the conventional, since it is not permanently coupled, but selectively engaged in the system of the W/T at low wind speeds, contributing both, to the increase of power output and to the annual energy production. The blade is single and independent, bears diametrically opposite a counterweight: a) to counterbalance the forces developed during the operational (coupled) period, and be balanced both, statically and dynamically, and b) to drive and stabilize the blade vertical in the front of the tower in the stand-by position (uncoupled).

The blade is preferably mounted on the outer surface of a hollow cylinder, coaxially with the main shaft of the main rotor and rotates around the main shaft in a plane parallel to the main rotor, and preferably behind it.

The coupling of the blade onto the system will be preferably at the stand-by state or at low wind speed operation of the W/T, while the uncoupling obviously can be performed during operating state and at the rated power. During the uncoupling and the stand-by position, the blade remains vertical and attached to the tower, covered entirely by it, in order not to raise any additional resistance (drag).

The blade is equipped preferably with power control & optimization systems based preferably on: a) the continuous altering of the direction (pitch angle/angle of attack) of the blade's airfoil in relation to the direction of the wind ("active pitch control"), or b) the simpler passive system of the detachment of the flow ("passive stall control") wherein the blade is fixed and permanently twisted, or c) a combination of a) +b).

In another variation the system of the W/T could be equipped with two independent generators: a small, approximately 50% of the conventional one, for the startup, and another approximately 120% of the conventional respectively, for the operating state. The generators will be successively connected into the system.

In addition, the blade could have the passive ability to be twisted and bent under the direct action of the wind pressure at high wind speeds, simultaneously adjusting both, the angle of attack by the twisting, and the rotor's swept area (diameter) by the bending (aeroelastic effect).

DETAILED DESCRIPTION OF THE INVENTION

It is known that a conventional W/T does not rotate at low wind speeds: speeds $V \leq V_c$ and in particular for $V \leq 3,5-4,5$ m/sec, where $V_c$ is the "cut-in speed", the speed at startup. The reason is the several kinds of losses that must be overcome by the rotational torque of the wind, since a substantial part of the wind energy potential is left unexploited.

It is also known that the power output of the W/T is proportional to the third power of wind speed V on the surface area A of the rotor: $N=f(V^3 * A)$, and as a consequence, proportional to the square of the rotor diameter D: $N=f(V^3 * D_2)$, since $A=\pi D^2/4$.

Figures 1, 2:
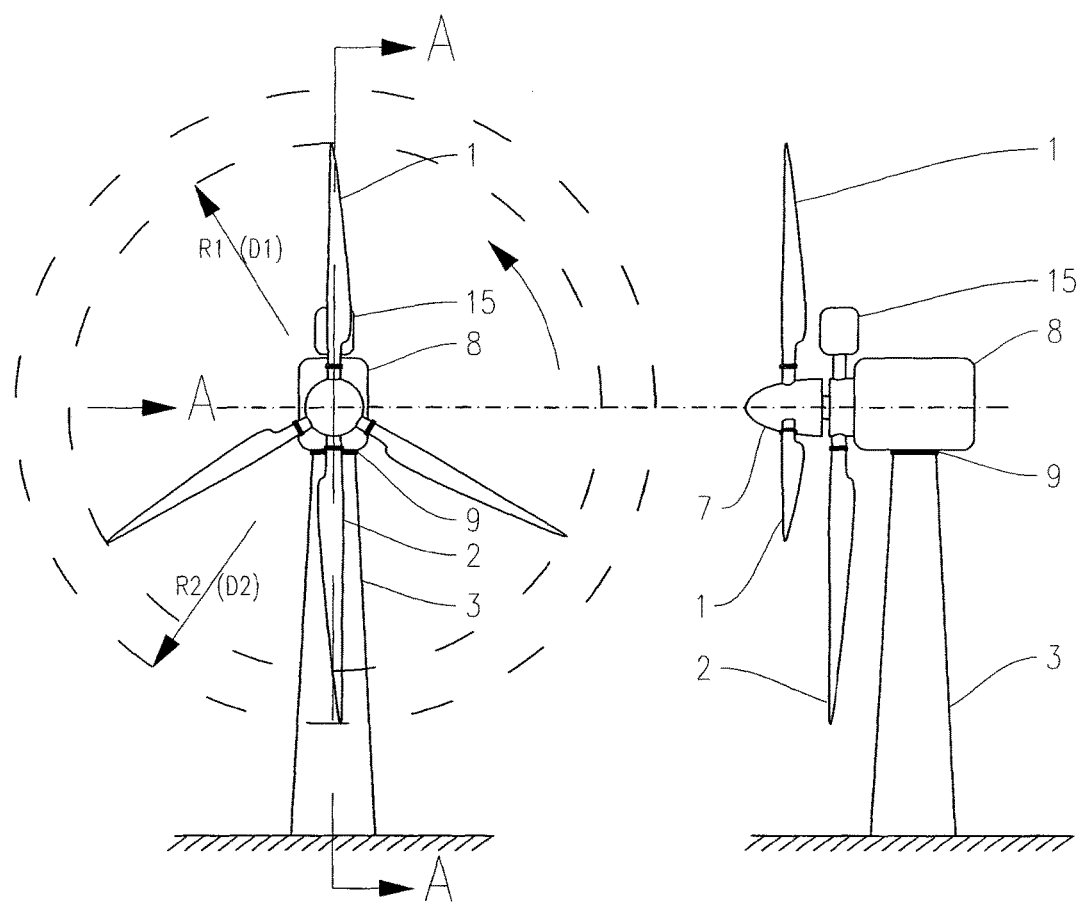
FIG. 1. Shows a view of the W/T of the present invention with an additional fourth blade.
FIG. 2. Shows a side view A of the W/T of FIG. 1.
Figures 3, 4:
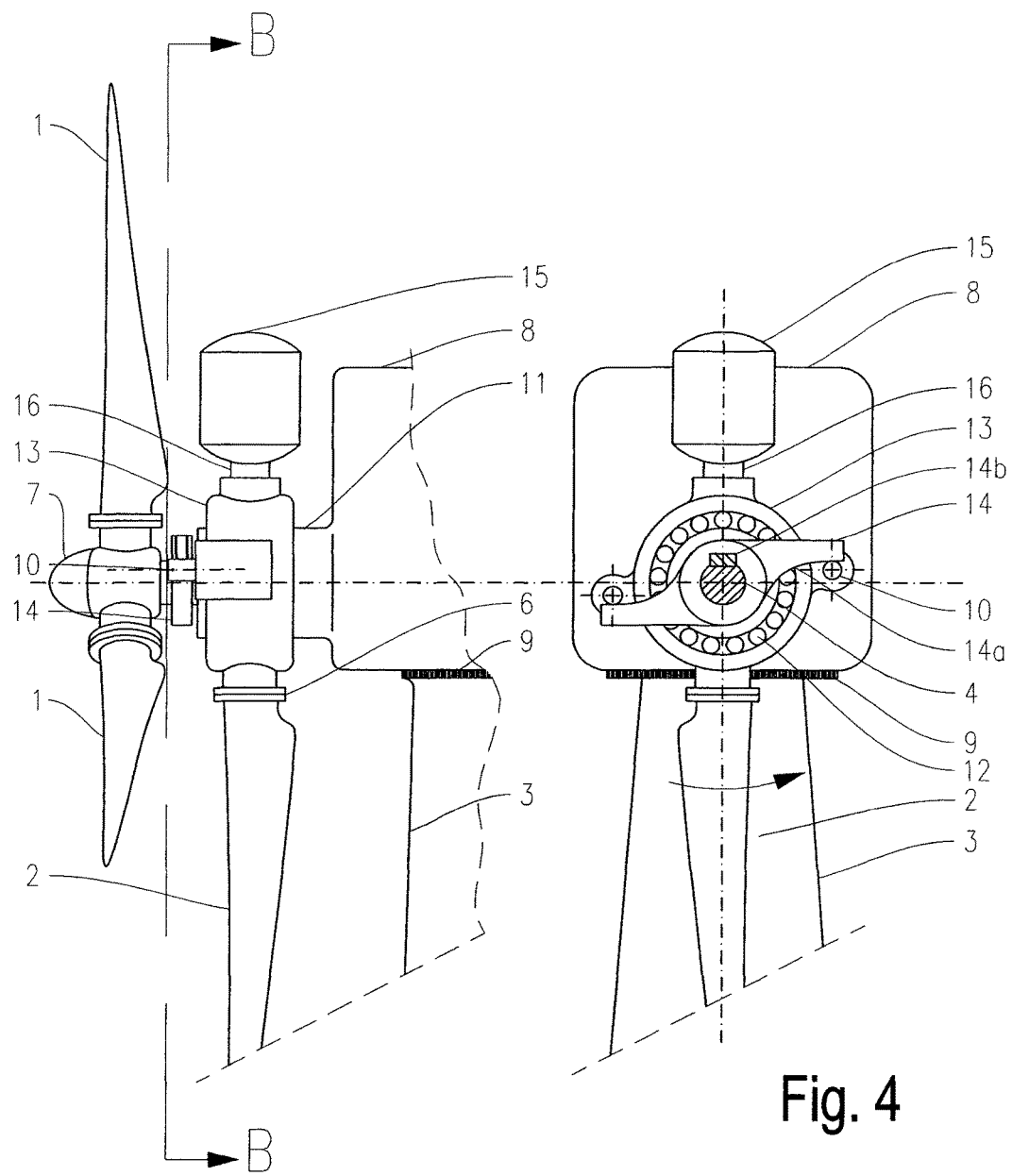
FIG. 3. Shows the side view A with a detail of a mounting proposal of the additional fourth blade of FIG. 1.
FIG. 4. Shows the section B-B of the shaft of the W/T with the detail of the coupling of the additional fourth blade to the system.

FIGS. 1, 2, 3 show the views of a conventional horizontal axis W/T with: three conventional blades 1 of propeller type of radius $R_1$ and diameter $D_1$, the hub 7, the nacelle 8 with the mechanisms, the yaw system 9, the tower 3, the shaft 4 of rotation, the gearbox 18, the disc brake, the generator, etc. The W/T cooperates with the new additional fourth blade 2 of diameter $D_2$ and radius $R_2$.

The additional fourth blade 2 is preferably mounded and fixed around a hollow cylindrical protrusion 11 of the nacelle 8 that surrounds the main shaft 4. The hub 13 of the blade 2 and the bearings 12 between the protrusion 11 and the hub 13 are also shown, while the main shaft 4 of the W/T is rotated supported by the bearings 5.

The blade 2 is equipped preferably with systems for the regulation, stabilization and optimization of the power output, based preferably: a) on the continuous altering of the direction of the blade airfoil (pitch angle/angle of attack) relative to the direction of the wind ("active pitch control"), or b) on the simpler passive system of the air flow detachment ("passive stall control") wherein the blade is mounded onto the hub, fixedly twisted, and its profile may display different pitch angles from the root towards the tip, or c) a combination of a) +b). The above control systems operate independently from those used by the blades 1, with which the blade 2 cooperates with.

Consequently the cross-section in the root of the blade 2 may be circular in most of the versions and may be mounted also in a circular flange-seat 6 which enables the smooth rotation of the blade 2 around its longitudinal axis, in order to alter continuously the pitch angle of the airfoil, the magnitude of the desired detachment of the flow, etc.

FIG. 4 shows the cross-section B-B of the shaft of the W/T, with the necessary counterweight 15, in order for the "blade-counterweight" system to be statically and dynamically balanced. The coupling of the additional fourth blade 2 in the system is preferably activated at the stand-by or at low speed of the W/T, while the blade 2 is preferably at stand-by position and vertically attached along the tower 3.

In this position and being attached along the tower 3, remains the blade 2 during of its uncoupling, in order not to be affected by the wind and to avoid the development of rotational torques, or wind pressures, that enhance the development of additional drag and overloads the whole system of the W/T.

The vertical position of the additional fourth blade 2 is preferably succeeded by moving of the counterweight 15 towards the center of rotation and towards the main shaft 4 and the hub 13 of the additional fourth blade 2. This movement (contraction of the telescopic system), can also preferably be activated by switching off of the hydraulic mechanism of the telescopic system 16. Similarly the above process could be performed by means of a motor-gear unit with toothed rack and pinion (not designed), which alters the balance of the "blade 2-counterweight 15", while the center of gravity is moved away from the shaft 4 of the W/T towards the blade 2.

With this movement of the center of gravity, the blade 2 acts as a pendulum in descending oscillation and is driven and stabilized at a vertical position along the tower 3. This action is enhanced by: a) proper position (pitch angle) of the airfoil of blade 2 relative to the direction of the wind by the "active pitch control" (if any) and b) an independent braking system.

The coupling could be also performed by an electromechanical rotation device, but it will be more easily achieved by the following procedure: On the outer surface (periphery), on the left and right side of the blade's hub 13, there are two parallel and preferably hydraulic pistons 10. Both pistons 10 lay in a plane passing through the axis 4.

Upon activation of the hydraulic system, the piston/bolts 10 are forwarded to the direction of the main rotor 1 right and left (from both sides) of the shaft 4. Between blade 2 and main rotor 1 are built-in two radial arms 14 which extend diametrically opposite, and are firmly connected to each other. The arms 14 are also fixedly connected with the shaft 4 by means of splines 14b.

The rotational direction of both, the main rotor of the W/T and the additional fourth blade 2 are the same, while the additional fourth blade 2 due to its larger diameter on one hand, and due to classical behavior as "monopteros-single blade" on the other, rotates faster than the main rotor 1. Thus, the two piston 10 being activated in projected position, always touch and press at the same point of the inner concave surface 14a the two arms 14, transferring the rotational torque always in the same direction, that of the system.

It is obvious that if the imaginary diameter that joins the two arms 14 is fixed and vertical on one of the conventional blades 1, then the additional fourth blade 2 will always be coupled automatically and symmetrically in the space between the two others.

The uncoupling takes place with the W/T in operation. By the deactivation of the hydraulic/bolt 10, that retracts, the arms 14 do not transmit torque on the shaft 4, while at the same time the hydraulic telescopic mechanism 16 of the counterweight 15 is deactivated and retracted, whereby the center of gravity of the system "blade 2-counterweight 15" will be disturbed, blade 2 acts as a pendulum and moves gradually in the stabilized vertical position at the front of the tower 3.

Figures 3A, 4A:
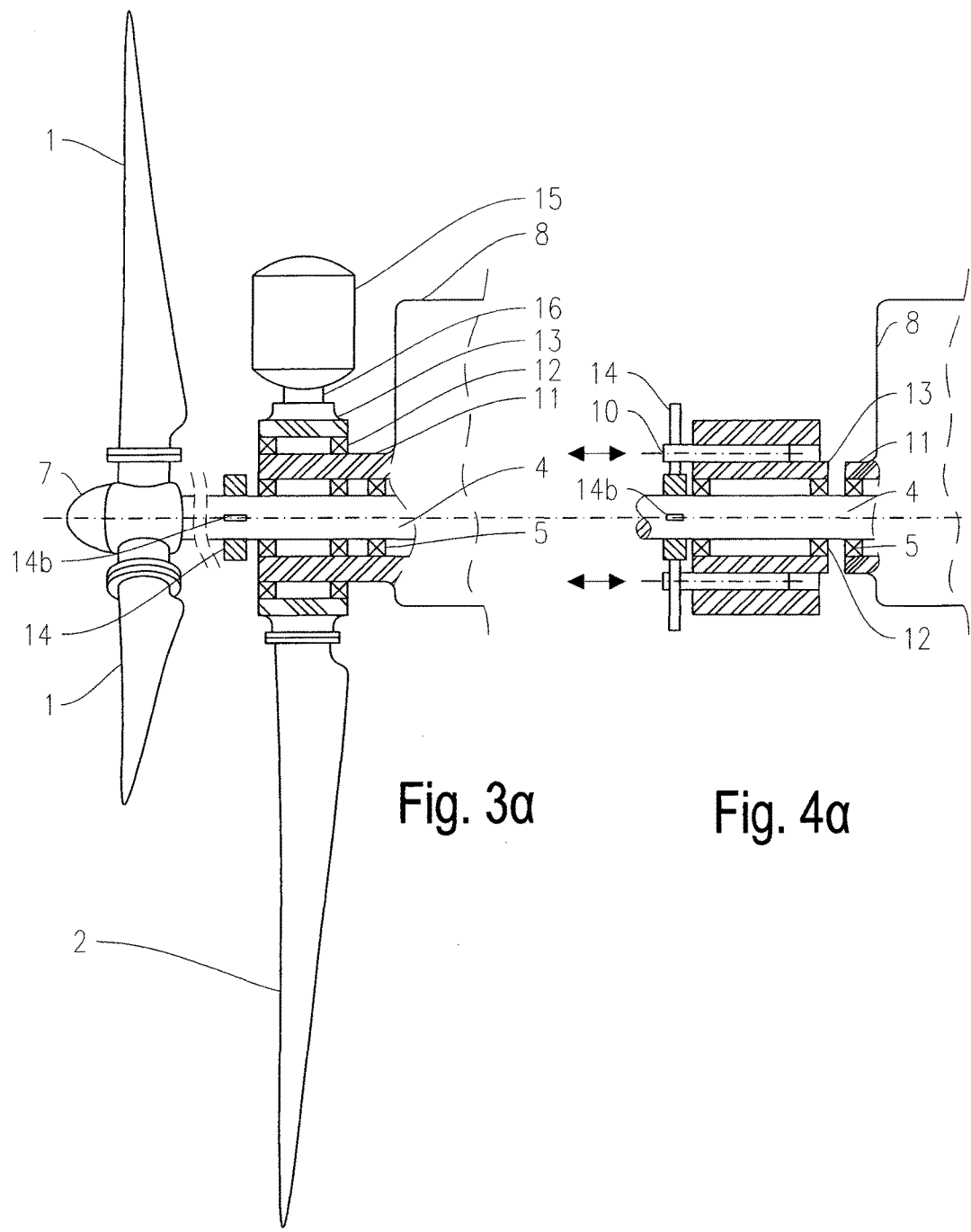
FIG. 3a shows the section A-A of FIG. 1 with a variation of the mounting proposal of the additional fourth blade on to the shaft of the W/T.
FIG. 4a. Shows a section of a variation of the way to connect the additional fourth blade directly onto the main shaft of the W/T.

This procedure is supported by the proper position of the pitch angle of the airfoil of the blade 2 relatively to the direction of the wind (by "active pitch control"), if any, or by an independent electromechanical brake system in FIG. 3a.

FIG. 4a shows in section a variation of a direct support of the blade 2 on the shaft 4 of the W/T, with the detail of the coupling-uncoupling system by means of the pistons 10 and the arms 14.

Figure 5:
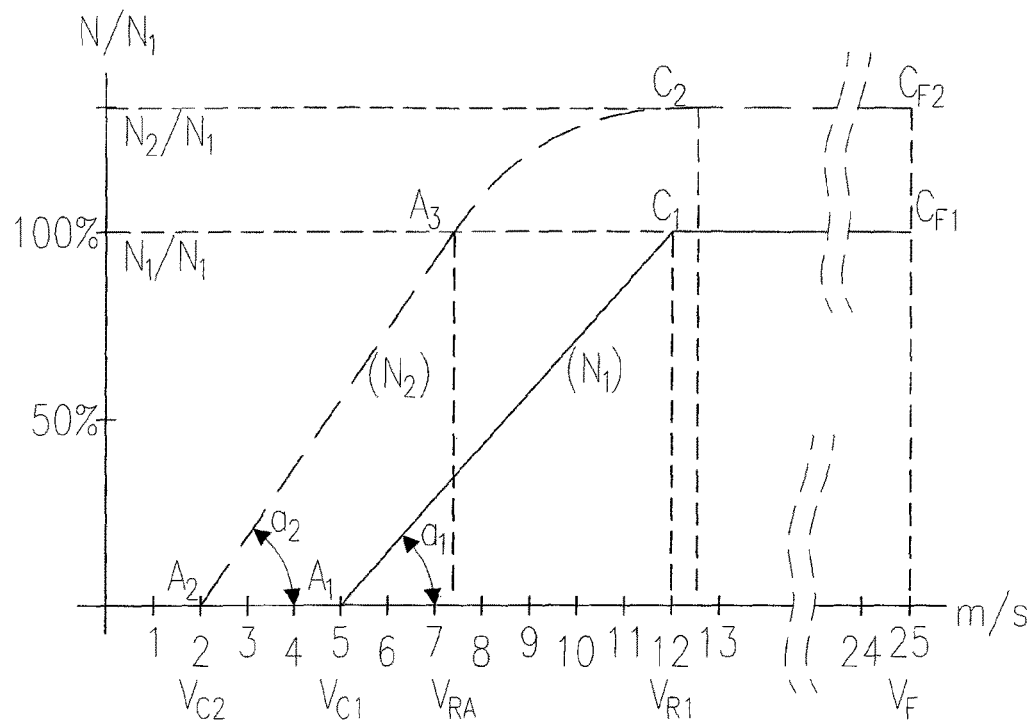
FIG. 5. Shows the power curves of Power vs. Wind Speed of a three bladed W/T with an additional fourth blade. Both are equipped with power control system (active pitch control).

FIG. 5. shows the power curves of Power vs. Wind Speed of the W/T of the FIGS. 1, 2, 3. The magnitudes of the power output in these diagrams are dimensionless and are illustrated qualitative as a percentage of the rated one.

The curve (N) (or $N/N_1$, as a percentage of the rated power $N_1$) refers to a conventional W/T conventionally dimensioned for a particular region according to the particular wind data, with three conventional blades 1 of diameter $D_1$. The W/T itself is equipped with a regulation & control power system by altering the pitch angle "pitch control", while the additional fourth blade 2 is not yet coupled to the W/T system.

The curve therefore follows the known simplified form of the straight lines $A_1C_1$ & $C_1C_{F1}$ and the W/T starts to rotate and to operate at the point $A_1$. The startup point $A_1$ corresponds to a relatively high speed, the "cut-in speed" $V_{c1}$ (of 3.5-4.5 m/sec) since it must overcome the startup losses that correspond to the particular dimensioning of a conventional W/T with the rated power of $N_1$.

At the breaking point $C_1$, which corresponds to the speed $V_{R1}$ ("rated output speed" of the rated power of the conventional W/T) the control and protection system "active pitch control" will keep the rated power output $N_1$ constant until the maximum "cut-out speed" $V_F$ of interruption, which corresponds to point $C_{F1}$, wherein the W/T for safety and security reasons will be switched off.

By coupling of the additional fourth blade 2 of significantly larger diameter $D_2$, the new power curve ($N_2$) (dashed line) is created resulting logically to a higher rated power output $N_2$ (or $N_2/N_1$, as a percentage of the rated power $N_1$ of the basic main W/T).

Note that in this case the structural and functional elements of the system of the conventional W/T, will not be reinforced, meaning that they will be not dimensioned to a higher class that corresponds to the greater diameter $D_2$. In this case we consider that the blade 2 is also equipped with an independent system of altering and adjusting the pitch angle ("active pitch control").

By coupling of the blade 2 we note that: a) the new power output of the new system W/T (new rated power $N_2$, or $N_2/N1$) illustrated with a dashed line, is significantly increased, b) the rotation starts at significantly lower wind speeds $V_{c2}$, ($V_{c2}<V_{c1}=3.5$ to 4.5 m/sec), c) the increase of the Power vs. Wind Speed is of significantly steeper inclination (exponential), and d) the annual energy production, which is the goal, is clearly greater. The reasons, besides the obvious advantage of the larger diameter $D_2$, are numerous:

By coupling of the blade 2 in the system of a W/T conventionally dimensioned based on the (smaller) diameter $D_1$, namely lighter, it is evident that the certainly stronger torque transmitted by the blade 2 will cause the startup of rotation already at the point $A_2$, i.e. at much lower "cut-in speeds" $V_{c2}$, ($V_{c2}<V_{c1}$).

The above is obvious, since: a) the elements of the W/T: gearbox, generator, etc., have not been particularly reinforced, and therefore the startup losses are kept low, and b) the blade 2 is equipped by independent control and adjustment systems of the pitch angle i.e.

"active pitch control", which is activated already from the start of the coupling, so that the blade 2 is adjusted at the appropriate pitch angle giving to the system augmented torque.

Regarding the inclination of the new power curve ($N_2$) (or $N_2/N_1$), this will follow a clearly steeper (exponential) increase, since due to "a priori" conventional (lighter) dimensioning based on the rotor diameter $D_1$, the structure is lighter, if this relays on the new data (diameter $D_2$). Normally the new power curve should follow its own independent course, and in simplified form, the lines $A_2A_3C_2$-$C_2C_{F2}$.

In reality, however, the power output cannot exceed, for safety and protection reasons, the rated power $N_1$ (or $N_1/N_1$) of the conventional W/T, due to its "a priori" conventional (lighter) dimensioning.

For this reason, at the point $A_3$ where the new power curve ($N_2$) meets the rated power of the basic curve $N_1$ (or $N_1/N_1$), the independent "active pitch control" system of the blade 2 will keep constant the new power output at the level of $N_1$, and so the highest power output will be limited and equal to the rated $N_1$, and the new curve will follow the course (approximately straight line) $A_3C_1$ of the conventional W/T. After reaching the point $C_1$ the blade 2 is no longer needed and will be disconnected, as the production with the rated power $N_1$ by the conventional W/T has already started.

The point $A_3$ corresponds to wind speed $V_{RA}$, which is clearly lower than the speed $V_{R1}$ (rated output speed) of point $C_1$, from where production of the rated power starts, limiting at the same time for safety and operational reasons the power output of the conventional W/T. Therefore, reaching the rated power $N_1$ of the new system of the W/T, starts much earlier (point $A_3$), and at lower cut-in speeds, ensuring greater annual energy production.

Figure 6:
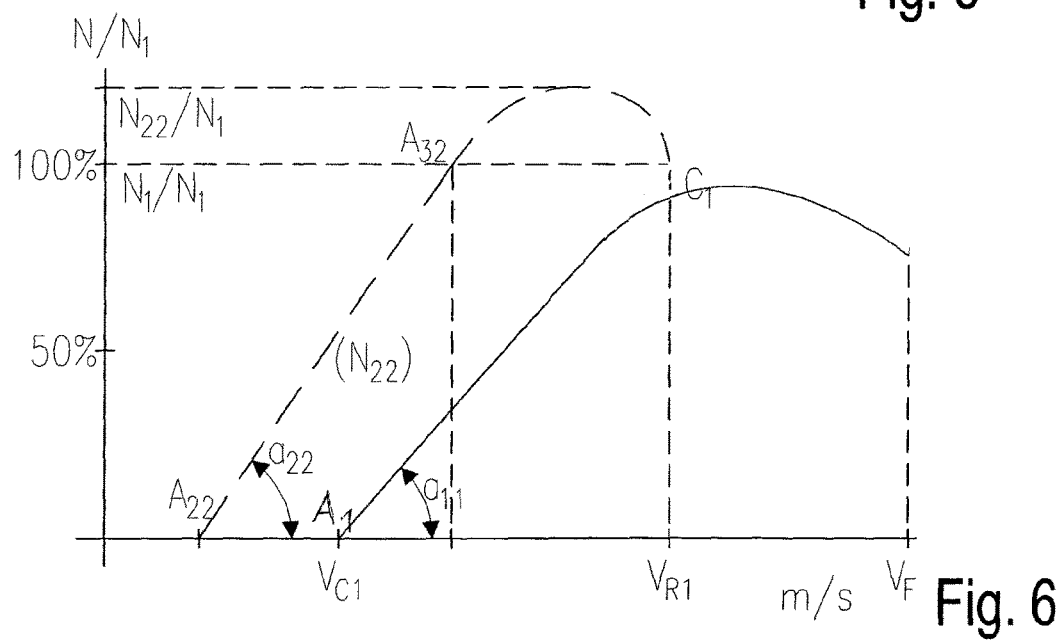
FIG. 6. Shows the power curves of Power vs. Wind Speed of a conventional W/T with an additional fourth blade. Both are equipped with passive power control system (Stall control).

FIG. 6 shows the power curves also of a W/T of FIGS. 1, 2, 3, with and without additional fourth blade 2 both equipped with passive ("stall control") system. Blade 2 also with passive power regulation, is the simpler and cheaper version of the new invention, and cooperates perfectly with a conventional W/T of the same also simple regulation technology ("stall control").

The power output in these diagrams is also a dimensionless value, and is shown qualitative as a percentage of the rated power. The solid line curve relates to the conventional W/T from FIG. 1, 2, 3, without the additional fourth blade 2 been coupled.

It is clear that after the coupling of the blade 2, the new power curve ($N_{22}$) (dashed line & new rated power $N_{22}/N_1$), shows a clearly steep (exponential) increase almost similar to that of ($N_2$) in FIG. 5, since despite the fact that blade 2 is not equipped with "active pitch control" system, the passive system "Stall control", is equally effective.

The new power curve, along with the operation of the new W/T system, starts at the point $A_{22}$, i.e. at lower cut-in speeds (which are clearly lower than $V_{c1}$ of the corresponding point $A_1$) and follows its own independent course by following the simplified straight line $A_{22}A_{32}$ with a rated power $N_{22}$, clearly greater than the conventional $N_1$ one.

In reality, however, for safety and stability reasons of the conventional W/T, it cannot exceed much over the power output $N_1$ (or $N_1/N_1$), due to its "a priori" conventional (lighter) dimensioning. Thus, from the point $A_{32}$, the power output will slightly exceed $N_1$ and blade 2 will be uncoupled from the system of the W/T just before the point $C_1$, from which both the production of the rated power and at the same time the power limitation of the conventional W/T, by means of the control system of its own blades 1, will start.

We note that the slight increase in the power output after the breaking point $A_{32}$ and its decline just after (curve $A_{32}{:}C_1$) is a general feature of the W/T system with passive power regulation "stall control", in contrast to the "active pitch control" systems, wherein the rated power is continuously adjustable and is kept constant. We also state, that a generator 10%-20% stronger than the conventional one, could offer a great advantage in this transitional phase, namely in the interval between point $A_{32}$ and point $C_1$, without burdening substantially the overall cost.

Therefore, reaching of the rated power output $N_1$ of the new W/T system, starts much earlier (from the point $A_{32}$ instead of point $C_1$) and at lower cut-in speeds, ensuring greater annual energy production.

The "cut-out speed" $V_F$ is the same for all alternatives and power output curves: ($N_1$), ($N_2$) & ($N_{22}$), of the FIGS. 5, 6, and therefore constitutes the common limit of the operation of all of them.

Comparing also the above power curves ($N_1$), ($N_2$) & ($N_{22}$), of FIGS. 5, 6 for a given wind potential, it is shown that the total annual energy production: $P_1$, $P_2$ & $P_{22}$, corresponding to the above power outputs, is graded as follows: $P_1 < P_{22} < P_2$, with the energy of $P_2$, corresponding to a blade 2 with the independent "active pitch control", to be the greatest. The reason is that the control process of this system is continuous aiming for both the protection as well as the optimization of the efficiency.

In particular cases, where the wind potential of the region is in general low, the contribution of the blade 2 is particularly vital, since: a) the startup of the operation is at significantly lower ($V_{c2}$) cut-in speeds ($V_{c2} < V_{c1}$), and blade 2 remains most of the year coupled into the W/T increasing significantly the energy production, reducing rapidly the time for the amortization of the additional investment, b) without any issue for the other structural elements of the W/T system, the generator of the system could be sized at least 20% stronger, with a clear and immediate increase in annual energy production, and c) it enables the development and the electrification of particularly lowlands, where however there is typically the biggest concentration for demand of energy.

In another version of the W/T, the system could be equipped with two independent generators: a very small one, almost 50% of the conventional size, for the startup, and another approximately 120% of the conventional respectively, for the rated operation. The generators are connected to the system successively. Such a variation would increase the production, since it would clearly prolong the operational time of the blade 2 in the system, and would also increase the rated power of the conventional W/T, since the additional fourth blade 2 offers immediate and significant increase in torque to the shaft of the W/T. In another variation, the blade 2 has a structure of laminated synthetic fibers, enabling at high wind speeds the automatic passive twisting and bending of the blade, altering simultaneously both the pitch angle as well as its diameter, under the action of the wind pressure (aeroelastic effect). Not designed.

The blade 2 could also bear special aerodynamic serrated elements (flaps, or tips-vanes) mounted at the airflow breakaway edge, or a plurality of aerodynamic protrusions of small height fixed perpendicular at the blade 2, and on to the outer convex surface of it, selectively creating low turbulence eddy currents (vortex generators) delaying the detachment of airflow and increasing the driving forces. Not designed.

In order to protect the whole structure, besides other safety systems, an interruption of the power supply uncouples and disconnects the blade 2 and switches-off the hydraulic system of the telescopic mechanism 16 of the counterweight 15, which retracts automatically the mechanism 16, stopping gradually but quickly the blade 2 driving and immobilizing it to its initial vertical stand-by position.

In another variation, the coupling of the blade 2 in the system of the W/T can be done also with very different ways and means, such as by electromagnetic coupling, etc. Not designed.

In another variation, the conventional rotor could bear only two diametrically opposite conventional blades 1, so that the two additional blades should either: a) be two independent and identical, diametrically opposite aligned and arranged, rotating in two parallel planes (clock hands) in the coupling phase, while both go down and will remain parallel to each other along the tower 3 in the phase of uncoupling, or b) to be permanently and diametrically opposite connected to each other (one body). Not designed.

It is obvious that new variations could be created with combinations of the aforementioned.

What is claimed is:

1. A horizontal axis wind turbine of propeller type comprising:
   a horizontal main shaft (4);
   a main rotor comprising a first hub and three first blades (1) arranged around the hub, the main rotor being permanently fixed to the main shaft (4); and
   an additional rotor comprising a second hub (13) and fourth blade (2) of longer length than a length of each of the three first blades (1), the second hub (13) surrounding the main shaft (4), the additional rotor being configured for being selectively coupled to the main rotor, the main and additional rotors both being configured to rotate in parallel planes to each other, in a same direction of rotation, and coaxially with the main shaft (4);
   wherein, the fourth blade (2) of the additional rotor is configured for being positioned between two successive blades of the main rotor and diametrically opposite to the third blade of the main rotor, when the main and additional rotors are coupled;
   wherein the fourth blade (2) is configured for remaining in a stand-by position when the additional rotor is uncoupled from main rotor, stopped and stored in a vertical orientation.

2. The horizontal axis wind turbine according to claim 1, wherein the additional rotor comprises a counterweight (15) disposed diametrically opposite to the fourth blade (2), the counterweight (15) being more compact than the fourth blade (2).

3. The horizontal axis wind turbine according to claim 2, wherein the counterweight (15) comprises a telescopic mechanism (16) configured to move the counterweight (15) toward and away from the main shaft (4) during a rotation of the additional rotor to control the rotation of the additional rotor.

4. The horizontal axis wind turbine according to claim 1, wherein the additional rotor comprises a control system of active pitch or passive stall type or of a combination thereof.

5. The horizontal axis wind turbine according to claim 1, wherein;
   the horizontal axis wind turbine comprises two arms (14) fixedly joined to and extending radially away from the main shaft (4), the two arms (14) being disposed symmetrically to each other about the main shaft (4);
   the additional rotor comprises at the second hub (13) two pistons (10) that are disposed symmetrically to each other about a center of the second hub (13) and lie parallel to an axis of the main shaft (4), the pistons (10) being configured to move parallel to the axis of the main shaft (4);
   the pistons (10) are configured to engage with the arms (14) by being moved toward the arms (14) and contacting respective sides of the two arms (14), thereby transmitting a rotational torque from the additional rotor to the main shaft (4) and coupling the additional rotor to the main rotor;
   the pistons (10) are configured to disengage from the arms (14) by being retracted into the second hub, thereby uncoupling the additional rotor from the main rotor.

6. The horizontal axis wind turbine according to claim 1, wherein the additional rotor comprises an independent brake system (17).

7. The horizontal axis wind turbine according to claim 1, wherein the additional rotor is joined to and rotatably mounted around a hollow cylindrical protrusion (11) of a nacelle (8) that surrounds the main shaft (4).

8. The horizontal axis wind turbine according to claim 1, wherein the additional blade (2) is fixed, rotatable mounded, and directly supported onto the main shaft (4).

9. The horizontal axis wind turbine according to claim 1, further comprising two separate generators: a smaller one for startup, and a larger one for operation at rated power.

* * * * *